(12) United States Patent
Liu et al.

(10) Patent No.: US 11,106,210 B2
(45) Date of Patent: Aug. 31, 2021

(54) METHOD FOR ANGLE CORRECTION OF MOBILE ROBOT IN WORKING AREA AND MOBILE ROBOT

(71) Applicant: GuangDong BONA Robot Co., Ltd., Shenzhen (CN)

(72) Inventors: Haoxin Liu, Shenzhen (CN); Kai Yang, Shenzhen (CN); Huang Ding, Shenzhen (CN); Zhuobin Zheng, Shenzhen (CN)

(73) Assignee: GUANGDONG BONA ROBOT CO., LTD., Shenzhen (CN)

( * ) Notice: Subject to any disclaimer, the term of this patent is extended or adjusted under 35 U.S.C. 154(b) by 208 days.

(21) Appl. No.: 16/460,965

(22) Filed: Jul. 2, 2019

(65) Prior Publication Data

US 2019/0324465 A1 Oct. 24, 2019

Related U.S. Application Data

(63) Continuation of application No. PCT/CN2018/073881, filed on Jan. 23, 2018.

(30) Foreign Application Priority Data

Apr. 24, 2017 (CN) .......................... 201710269782.2

(51) Int. Cl.
*G05D 1/02* (2020.01)
*B25J 9/16* (2006.01)
*B25J 11/00* (2006.01)

(52) U.S. Cl.
CPC .......... *G05D 1/0214* (2013.01); *B25J 9/1666* (2013.01); *B25J 11/0085* (2013.01); *G05D 1/0242* (2013.01)

(58) Field of Classification Search
CPC .... B25J 9/1666; B25J 11/0085; B25J 9/1664; B25J 9/1679; B25J 9/1653; B25J 9/1661;
(Continued)

(56) References Cited

U.S. PATENT DOCUMENTS

| 4,815,008 A * | 3/1989 | Kadonoff | G05D 1/0234 180/169 |
| 2006/0217854 A1* | 9/2006 | Takenaka | G05D 1/0242 701/23 |

(Continued)

FOREIGN PATENT DOCUMENTS

| CN | 203376801 U | 1/2014 |
| CN | 106155056 A | 11/2016 |

(Continued)

OTHER PUBLICATIONS

International Search Report and Written Opinion in corresponding International Application No. PCT/US2018/073881, dated Apr. 10, 2018, 12 pages.
(Continued)

*Primary Examiner* — Khoi H Tran
*Assistant Examiner* — Nhi Q Bui
(74) *Attorney, Agent, or Firm* — Bayes PLLC

(57) ABSTRACT

Methods for angle correction of a mobile robot in a working area and mobile robots performing the same are disclosed. In one example, a long straight line is obtained at an edge of an obstacle first found by the mobile robot. A right-angle coordinate system is established based on the long straight line. A walking angle of the mobile robot is obtained when the mobile robot finds a long straight line at an edge of an obstacle again. Based on the walking angle and the right-angle coordinate system, the walking angle is corrected to a corresponding axis direction.

19 Claims, 6 Drawing Sheets

(58) Field of Classification Search
CPC ... B25J 11/008; G05D 1/0214; G05D 1/0242; G05D 1/0238; G05D 1/0231
See application file for complete search history.

(56) References Cited

U.S. PATENT DOCUMENTS

| | | | | |
|---|---|---|---|---|
| 2009/0024353 | A1* | 1/2009 | Lee | G06T 7/73 |
| | | | | 702/153 |
| 2009/0292394 | A1* | 11/2009 | Hyung | G05D 1/0274 |
| | | | | 700/251 |

FOREIGN PATENT DOCUMENTS

| | | |
|---|---|---|
| CN | 206020207 U | 3/2017 |
| CN | 106959695 A | 7/2017 |
| EP | 3133457 A1 | 2/2017 |
| FR | 2861856 A1 | 5/2005 |
| JP | 2004275468 A | 10/2004 |
| JP | 2016134081 A | 7/2016 |
| WO | 2016102141 A1 | 6/2016 |

OTHER PUBLICATIONS

Office action issued in corresponding Chinese Application No. 201710269782.2, dated Mar. 8, 2019.

Non-Final Notice of Reasons for Rejection issued in related Japanese Application No. 2019-541140, dated Aug. 25, 2020, 5 pages.

\* cited by examiner

METHOD FOR ANGLE CORRECTION OF MOBILE ROBOT IN WORKING AREA AND MOBILE ROBOT

CROSS REFERENCE TO RELATED APPLICATION

This application is continuation of International Application No. PCT/CN2018/073881, filed on Jan. 23, 2018, entitled "METHOD FOR ANGLE CORRECTION OF MOBILE ROBOT IN WORKING AREA AND MOBILE ROBOT," which claims benefit of priority to Chinese Patent Application No. 201710269782.2, filed on Apr. 24, 2017, both of which are hereby incorporated by reference in their entireties.

BACKGROUND

Existing mobile robots (such as cleaning robots) use inertial navigation principle to measure their own angles. After a period of time, cumulative errors will cause a mobile robot to be inaccurate in its obtained own angle, which will affect the recharging efficiency and coverage efficiency of mobile robots in the working area.

For above problems, the existing technical solution enables the correction of the mobile robot's own angle by installing a camera on the mobile robot to identify the surrounding feature points (such as feature points on the ceiling or artificially set marks); or by setting beacons at the working area boundary so that the mobile robot can adjust its position and angle after detecting signals sent from the beacons.

However, the above method requires additional parts to achieve, which increases the cost of mobile robots and makes control more complex.

SUMMARY

One of the purposes of the present disclosure is to overcome the drawbacks in the background technology and to provide an angle correction method of a mobile robot in a working area, the solution of the method of the present disclosure being as follows:

an angle correction method of a mobile robot in a working area, comprising:

obtaining a long straight line at an edge of an obstacle first found by the mobile robot;

establishing a right-angle coordinate system based on the long straight line;

obtaining a walking angle of the mobile robot when it finds a long straight line at an edge of an obstacle again;

based on the walking angle and the right-angle coordinate system, correcting the walking angle to a corresponding axis direction.

Further, the step of based on the walking angle and the right-angle coordinate system, correcting the walking angle to a corresponding axis direction also includes:

when the angle difference between the walking angle and the axis direction of the right-angle coordinate system is less than a preset value, correcting the walking angle to the corresponding axis direction.

Further, the long straight line is a straight line or an approximate straight line with a length greater than a preset value.

Further, after based on the walking angle and the right-angle coordinate system, correcting the walking angle to a corresponding axis direction, the method also comprises:

repeating the step of obtaining a walking angle of the mobile robot when it finds a long straight line at an edge of an obstacle again and the step of based on the walking angle and the right-angle coordinate system, correcting the walking angle to a corresponding axis direction, until the mobile robot completes the work in the working area.

Further, the step of obtaining a long straight line at an edge of an obstacle first found by the mobile robot also includes:

the mobile robot moving in a straight line until it encounters an obstacle and walks along an edge of the obstacle;

obtaining a walking angle of the mobile robot multiple times within a predetermined time T0;

based on the multiple walking angles of the mobile robot, determining whether the multiple walking angle values are near A0 and the amount of change is less than a threshold D0;

if yes, using the edge of the obstacle as the obtained long straight line.

Further, the step of if yes, using the edge of the obstacle as the obtained long straight line also includes:

if not, controlling the mobile robot's straight line motion after the mobile robot moves a predetermined time t0 or a predetermined distance d0 until it encounters an obstacle and walks along an edge of the obstacle.

Further, the step of if yes, using the edge of the obstacle as the obtained long straight line also includes:

obtaining a time the mobile robot walks along the obstacle;

based on the time the mobile robot walks along the obstacle, determining whether the time the mobile robot walks along the obstacle is greater than a predetermined value;

if yes, stopping walking along the edge of the obstacle and controlling the mobile robot's straight line motion until it encounters an obstacle and walks along an edge of the obstacle.

Further, the step of if yes, using the edge of the obstacle as the obtained long straight line also includes:

obtaining a rotating angle in which the mobile robot walks along the obstacle;

based on the rotating angle in which the mobile robot walks along the obstacle, determining whether the rotating angle in which the mobile robot walks along the obstacle is greater than a predetermined value;

if yes, stopping walking along the edge of the obstacle and controlling the mobile robot's straight line motion until it encounters an obstacle and walks along an edge of the obstacle.

Further, the step of establishing a right-angle coordinate system based on the long straight line also includes:

establishing the right-angle coordinate system using the mobile robot as an origin, using an A0 direction of the long straight line as an X-axis positive direction, using a left vertical direction or right vertical direction perpendicular to the A0 direction of the long straight line as a Y-axis positive direction.

Further, the step of obtaining a walking angle of the mobile robot when it finds a long straight line at an edge of an obstacle again also includes:

the mobile robot moving in a straight line until it encounters an obstacle and walks along an edge of the obstacle;

obtaining a walking angle of the mobile robot multiple times within a predetermined time T1;

based on the multiple walking angles of the mobile robot, determining whether the multiple walking angle values are near A1 and the amount of change is less than a threshold D1;

if yes, using A1 as the walking angle.

Further, the step of if yes, using A1 as the walking angle also includes:

if not, controlling the mobile robot's straight line motion after the mobile robot moves a predetermined time t1 or a predetermined distance d1 until it encounters an obstacle and walks along an edge of the obstacle.

Further, the step of based on the walking angle and the right-angle coordinate system, correcting the walking angle to a corresponding axis direction also includes:

based on the walking angle A1, obtaining angle differences Dx+, Dx−, Dy+, Dy− between the walking angle A1 and the x-axis positive and negative directions, y-axis positive and negative directions of the right-angle coordinate system;

determining whether Dx+, Dx−, Dy+, Dy− are less than a threshold D2;

if yes, correcting the current angle of the mobile robot to the direction of the corresponding axis.

Further, the step of if yes, correcting the current angle of the mobile robot to the direction of the corresponding axis also includes:

if not, controlling the mobile robot's straight line motion after the mobile robot moves a predetermined time t2 or a predetermined distance d2 until it encounters an obstacle and walks along an edge of the obstacle.

The second one of the purposes of the present disclosure is to overcome the drawbacks in the background technology and to provide a mobile robot having an angle correction function, the specific solution of the mobile robot of the present disclosure being as follows:

a mobile robot, comprising a controller, a drive system, an angle sensor, an edge sensor, a distance sensor, and a memory, the edge sensor being used to detect an edge of an obstacle in a working area and to make the mobile robot move along the edge of the obstacle;

the controller being used to: detect whether a long straight line is present at the edge of the obstacle according to information received from the edge sensor, establish a right-angle coordinate system using the long straight line detected for the first time as a reference, obtain a walking angle of the mobile robot when a long straight line is detected again, and when an angle difference between the walking angle and an axis direction of the right-angle coordinate system is less than a preset value, correct the walking angle of the mobile robot to the corresponding axis direction, wherein, the long straight line is defined as a straight line or an approximate straight line that has a length larger than a preset value;

the drive system being used to drive the mobile robot to move;

the angle sensor being used to obtain the walking angle of the mobile robot in real time;

the distance sensor being used to obtain a walking distance of the mobile robot;

the memory being used to store right-angle coordinate system information and various preset values.

Further, the angle sensor is a gyroscope or an electronic compass;

the edge sensor is an infrared sensor;

the distance sensor is an odometer.

Further, the mobile robot is a cleaning robot.

The technical solution disclosed by the present disclosure uses the long straight line at the edge of the obstacle in the working area of the mobile robot as a reference to adjust its walking angle. The solution of the present disclosure has low cost, is easy to implement and has good effect, and can be used for the overlay path planning of the mobile robot.

BRIEF DESCRIPTION OF THE DRAWINGS

In order to more clearly explain the technical solution of the embodiment of the present disclosure, the following will be a brief introduction of the drawings to be used in the embodiment. It is obvious that the drawings in the following description are some embodiments of the present disclosure, and for a person having ordinary skill in the art, other drawings can also be obtained based on these drawings without involving inventive skills.

DETAILED DESCRIPTION

A clear and complete description of the technical solution of the present disclosure will be provided in conjunction with the drawings and specific embodiments. It is clear that the embodiments described herein are only parts of the embodiments of the present disclosure, not all of them. Based on the specific embodiments described in the present disclosure, all other embodiments obtained by a person having ordinary skill in the art without inventive skills shall fall within the scope of protection as defined by the claims of the present disclosure.

Figure 1:
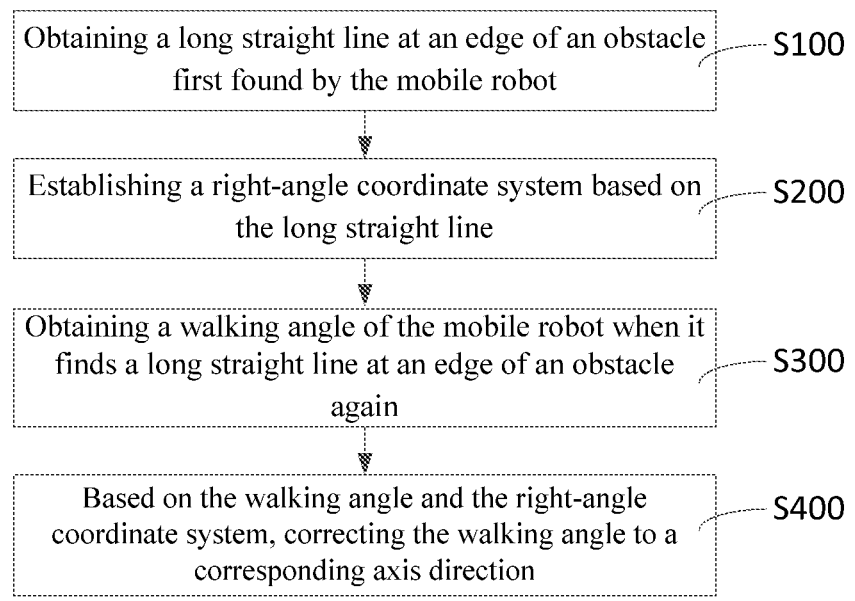
FIG. 1 is a flowchart of an angle correction method for a mobile robot in a working area provided by an embodiment of the present disclosure.

Referring to FIG. 1, FIG. 1 is a flowchart of an angle correction method for a mobile robot in a working area provided by an embodiment of the present disclosure.

As shown in FIG. 1, the angle correction method for the mobile robot in the working area may comprise the following steps S100 to S400.

Step S100: obtaining a long straight line at an edge of an obstacle first found by the mobile robot.

Specifically, the cleaning robot (mobile robot), after starting in the working area, initializes angle information (e.g. the forward direction is regarded as 0°) and moves forward in a straight line in the direction at start-up. Since the working area is limited, after a period of straight-line movement, it is bound to encounter obstacles (including walls and tables, sofas and other furniture). The cleaning robot (mobile robot) is controlled to move along an edge of an obstacle and detect a long straight line at the edge of the obstacle. The long straight line is a straight line or an approximate straight line with a length greater than a preset value.

Step S200: establishing a right-angle coordinate system based on the long straight line.

Specifically, the right-angle coordinate system is established using the mobile robot as an origin, using an A0 direction of the long straight line as an X-axis positive direction, using a left vertical direction or right vertical direction perpendicular to the A0 direction of the long straight line as a Y-axis positive direction. The right-angle coordinate system is then stored in a memory.

Step S300: obtaining a walking angle of the mobile robot when it finds a long straight line at an edge of an obstacle again.

Specifically, after establishing the right-angle coordinate system and after working for a period of time (e.g. 10 to 20 seconds) or walking a predetermined distance (e.g. 5 to 10 meters) according to a cleaning procedure, the cleaning robot starts moving in a straight line until it encounters an obstacle, then detects an edge of the obstacle by an infrared sensor and moves along the edge of the obstacle, and obtains the walking angle.

Step S400: based on the walking angle and the right-angle coordinate system, correcting the walking angle to a corresponding axis direction.

Specifically, when the angle difference between the walking angle and the axis direction of the right-angle coordinate system is less than a preset value, the walking angle is corrected to the corresponding axis direction. Step S300 and step S400 are repeated until the mobile robot completes the work in the working area.

Figure 2:
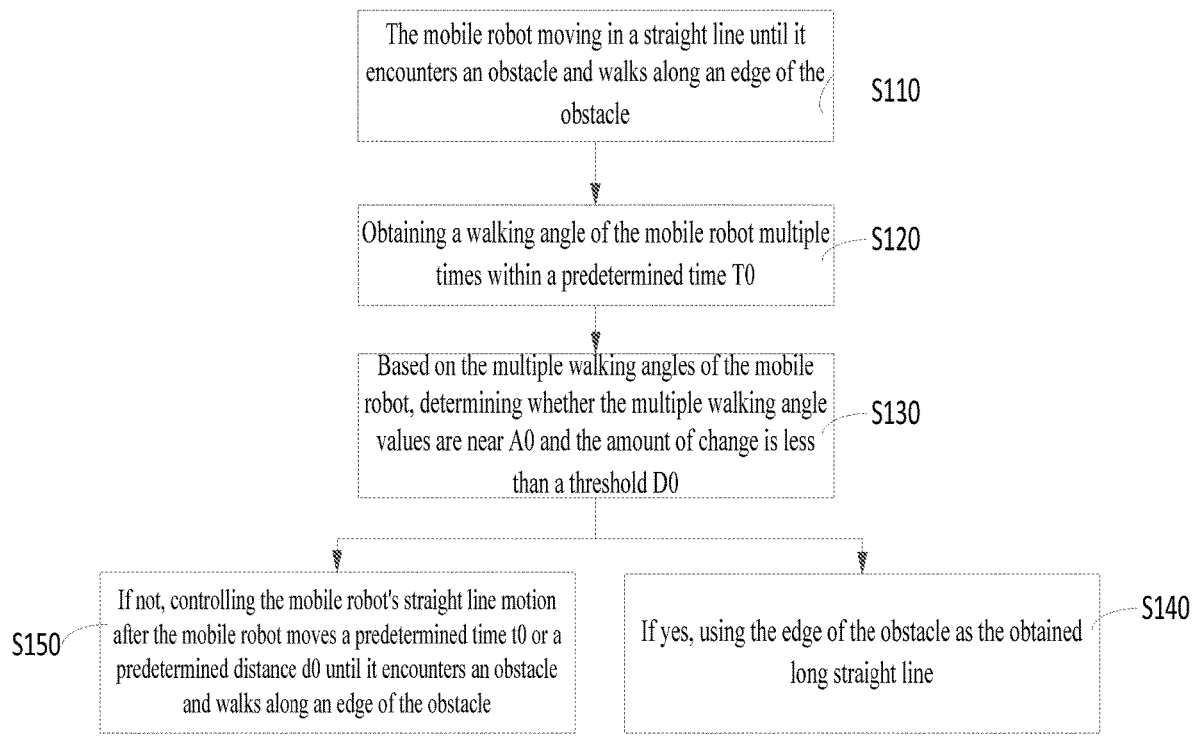
FIG. 2 is a flowchart of a method for obtaining a long straight line at an edge of an obstacle first found by the mobile robot provided by an embodiment of the present disclosure.

Referring to FIG. 2, FIG. 2 is a flowchart of a method for obtaining a long straight line at an edge of an obstacle first found by the mobile robot.

As shown in FIG. 2, the method for obtaining the long straight line at the edge of the obstacle first found by the mobile robot may comprise the following steps S110 to S150.

Step S110: the mobile robot moving in a straight line until it encounters an obstacle and walks along an edge of the obstacle.

Specifically, the cleaning robot (mobile robot), after starting in the working area, initializes angle information (e.g. the forward direction is regarded as 0°) and moves forward in a straight line in the direction at start-up. Since the working area is limited, after a period of straight-line movement, it is bound to encounter obstacles (including walls and tables, sofas and other furniture). The cleaning robot uses an infrared sensor to detect an edge of an obstacle and keep sensing the edge of the obstacle, allowing the cleaning robot to walk along the edge of the obstacle.

Step S120: obtaining a walking angle of the mobile robot multiple times within a predetermined time T0.

Specifically, the cleaning robot uses a gyroscope to capture the walking angle of the cleaning robot multiple times and transmit it to the controller at a fixed frequency (e.g. 100 Hz) within a predetermined time T0 (e.g. 2 seconds to 5 seconds).

Step S130: based on the multiple walking angles of the mobile robot, determining whether the multiple walking angle values are near A0 and the amount of change is less than a threshold D0.

Specifically, the controller determines by calculation whether the multiple walking angle data are near A0 (A0 is generally the average of the multiple angle values) and the differences with A0 are all less than the threshold D0 (1° in the present embodiment).

Step S140: if yes, using the edge of the obstacle as the obtained long straight line.

Specifically, if the above conditions are met, the cleaning robot is considered to be walking in a long straight line along the angle value A0 (relative to the angle at the start of the cleaning robot) during the T0 time period. The edge of the obstacle is used as the obtained long straight line.

Step S150: if not, controlling the mobile robot's straight line motion after the mobile robot moves a predetermined time t0 or a predetermined distance d0 until it encounters an obstacle and walks along an edge of the obstacle.

Specifically, if the above conditions are not met, it is considered that the cleaning robot walks along a non-long straight line in the T0 time period. After the cleaning robot works for a period of time t0 (e.g. 10 to 20 seconds) or walks a predetermined distance d0 (e.g. 5 meters to 10 meters) in accordance with a cleaning procedure, return to step S110.

In order to improve the efficiency of the cleaning robot looking for the long straight line at the first time, it is determined whether the cleaning robot has been walking along the obstacle for longer than a preset value (e.g. 10 seconds) or the rotation angle of the walk is greater than a preset value (e.g. 180°), and if so, the cleaning robot stops walking along the edge of the obstacle and returns to step S110, thus avoiding the cleaning robot from moving multiple times along the edge of the obstacle or cycling in the trapped area.

Figure 3:
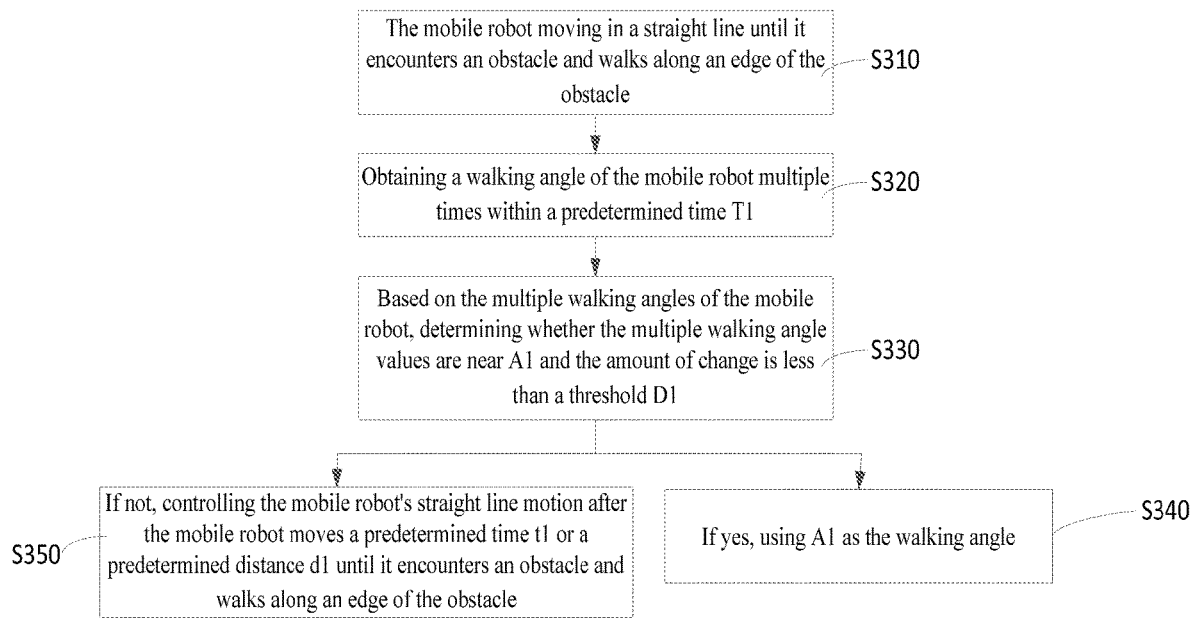
FIG. 3 is a flowchart of a method for obtaining a walking angle of the mobile robot when it finds a long straight line at an edge of an obstacle again provided by an embodiment of the present disclosure.

Referring to FIG. 3, FIG. 3 is a flowchart of a method for obtaining a walking angle of the mobile robot when it finds a long straight line at an edge of an obstacle again provided by an embodiment of the present disclosure.

As shown in FIG. 3, the method for obtaining the walking angle of the mobile robot when it finds a long straight line at an edge of an obstacle again may comprise the following steps S310 to S350.

Step S310: the mobile robot moving in a straight line until it encounters an obstacle and walks along an edge of the obstacle.

Specifically, after establishing the right-angle coordinate system and after working for a period of time (e.g. 10 to 20 seconds) or walking a predetermined distance (e.g. 5 to 10 meters) according to a cleaning procedure, the cleaning robot starts moving in a straight line until it encounters an obstacle, then detects the edge of the obstacle by an infrared sensor and moves along the edge of the obstacle.

Step S320: obtaining a walking angle of the mobile robot multiple times within a predetermined time T1.

Specifically, this step S320 is basically the same as step S120, i.e. to detect the presence of a long straight line at the edge of the current obstacle. Specifically, the cleaning robot uses a gyroscope to capture the walking angle of the cleaning robot multiple times and transmit it to the controller at a fixed frequency (e.g. 100 Hz) within a predetermined time T1 (e.g. 2 seconds to 5 seconds).

Step S330: based on the multiple walking angles of the mobile robot, determining whether the multiple walking angle values are near A1 and the amount of change is less than a threshold D1.

Specifically, the controller determines by calculation whether the multiple walking angle data are near A1 (A1 is generally the average of the multiple angle values) and the differences with A1 are all less than the threshold D1 (1° in the present embodiment).

Step S340: if yes, using A1 as the walking angle.

Specifically, if the above conditions are met, the cleaning robot is considered to be walking in a long straight line along the angle value A1 (relative to the right-angle coordinate system established in step S13) during the T1 time period, i.e., A1 is the walking angle of the cleaning robot.

Step S350: if not, controlling the mobile robot's straight line motion after the mobile robot moves a predetermined time t1 or a predetermined distance d1 until it encounters an obstacle and walks along an edge of the obstacle.

Specifically, if the above conditions are not met, it is considered that the cleaning robot walks along a non-long straight line in the T1 time period. After the cleaning robot works for a period of time t1 (e.g. 10 to 20 seconds) or walks a predetermined distance d1 (e.g. 5 meters to 10 meters) in accordance with a cleaning procedure, it returns to step S310.

Figure 4:
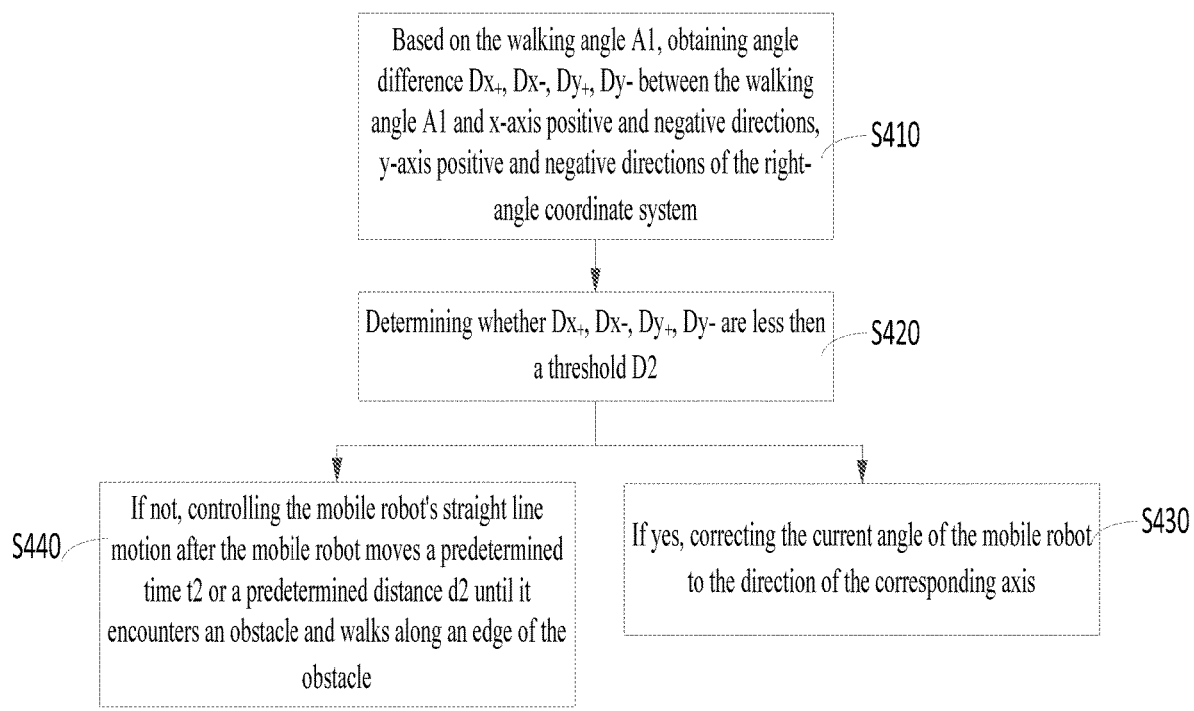
FIG. 4 is a flowchart of a method of correcting the walking angle to a corresponding axis direction provided by an embodiment of the present disclosure.

Referring to FIG. 4, FIG. 4 is a flowchart of a method of correcting the walking angle to a corresponding axis direction provided by an embodiment of the present disclosure.

As shown in FIG. 4, the method of correcting the walking angle to the corresponding axis direction may comprise the following steps S410 to S440.

Step S410: based on the walking angle A1, obtaining angle difference Dx+, Dx−, Dy+, Dy− between the walking angle A1 and x-axis positive and negative directions, y-axis positive and negative directions of the right-angle coordinate system.

Specifically, the controller calculates the angle difference Dx+ between A1 and the positive direction of the x-axis, the angle difference Dx− between A1 and the negative direction of the x-axis, the angle difference Dy+ between A1 and the positive direction of the y-axis, and the angle difference Dy− between A1 and the negative direction of the y-axis, respectively.

Step S420: determining whether Dx+, Dx−, Dy+, Dy− are less than a threshold D2.

Specifically, by comparing Dx+, Dx−, Dy+, Dy− and the threshold D2 (1° in this embodiment), Step S430: if yes, correcting the current angle of the mobile robot to the direction of the corresponding axis.

Specifically, if one of the Dx+, Dx−, Dy+, and Dy− is less than the threshold D2, it is considered that the long straight line should be parallel to the axis of the corresponding right-angle coordinate system, and the cleaning robot should make its own angle correction due to the cumulative error. If Dx+ is less than the threshold D2, the current direction of the cleaning robot is corrected to the positive direction of the x-axis of the coordinate system; if the Dx− is less than the threshold D2, the current direction of the cleaning robot is corrected to the negative direction the x-axis of the coordinate system; if Dy+ is less than the threshold D2, the current direction of the cleaning robot is corrected to the positive direction of the y-axis of the coordinate system; if Dy− is less than the threshold D2, the current running direction of the cleaning robot is corrected to the negative direction of the y-axis of the coordinate system.

Step S440: if not, controlling the mobile robot's straight line motion after the mobile robot moves a predetermined time t2 or a predetermined distance d2 until it encounters an obstacle and walks along an edge of the obstacle.

Specifically, if none of Dx+, Dx−, Dy+, and Dy− is less than D2, it is considered that the long straight line itself is not parallel to any axis directions of the coordinate system, and cannot be used as a reference to correct the cleaning robot. After the cleaning robot walks t2 (e.g. 10 to 20 seconds) or walks a predetermined distance d2 (e.g. 5 meters to 10 meters) according to the cleaning procedure, it returns to step S310.

Figure 5:
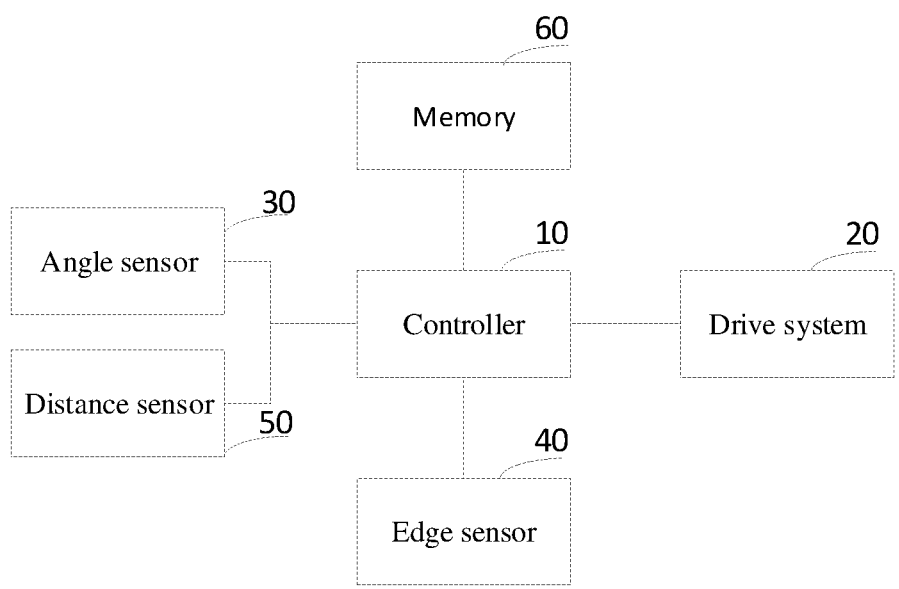
FIG. 5 is a hardware composition diagram of a cleaning robot of an embodiment of the present disclosure.

In the present embodiment, the mobile robot takes a cleaning robot as an example for illustration. As shown in FIG. 5, FIG. 5 is the hardware composition diagram of the cleaning robot of the embodiment of the present disclosure. The cleaning robot in the present embodiment comprises a controller 10, a drive system 20, an angle sensor 30 (a gyroscope in the present embodiment), a distance sensor 50 (an odometer in the present embodiment), an edge sensor 40 and a memory 60. Wherein, the edge sensor 40 is used to detect an edge of an obstacle in a working area and to make the mobile robot move along the edge of the obstacle. An infrared sensor is used in the present embodiment, which is mounted on the side of the cleaning robot, and used to detect a long straight line at an edge of obstacle in the working area, the long straight line being defined as a straight line or approximate straight line larger than a preset value (e.g. 0.5 to 2 meters). The controller 10 is used to: detect whether a long straight line is present at the edge of the obstacle according to information received from the edge sensor, establish a right-angle coordinate system using the long straight line detected for the first time as a reference, obtain a walking angle of the mobile robot when a long straight line is detected again, and when an angle difference between the walking angle and an axis direction of the right-angle coordinate system is less than a preset value (e.g. 5° to 10°), correct the walking angle of the mobile robot to the corresponding axis direction. The angle sensor 30 is used to obtain the walking angle of the mobile robot in real time, which is specifically a gyroscope in the present embodiment and also can be an electronic compass. The distance sensor 50 is used to obtain a walking distance of the mobile robot and is an odometer in the present embodiment. The memory 60 is used to store right-angle coordinate system information and various preset values and preset cleaning procedures. The memory can be a stand-alone memory or a memory integrated in the controller. The drive system 20 is used to drive the mobile robot to move.

Figure 6:
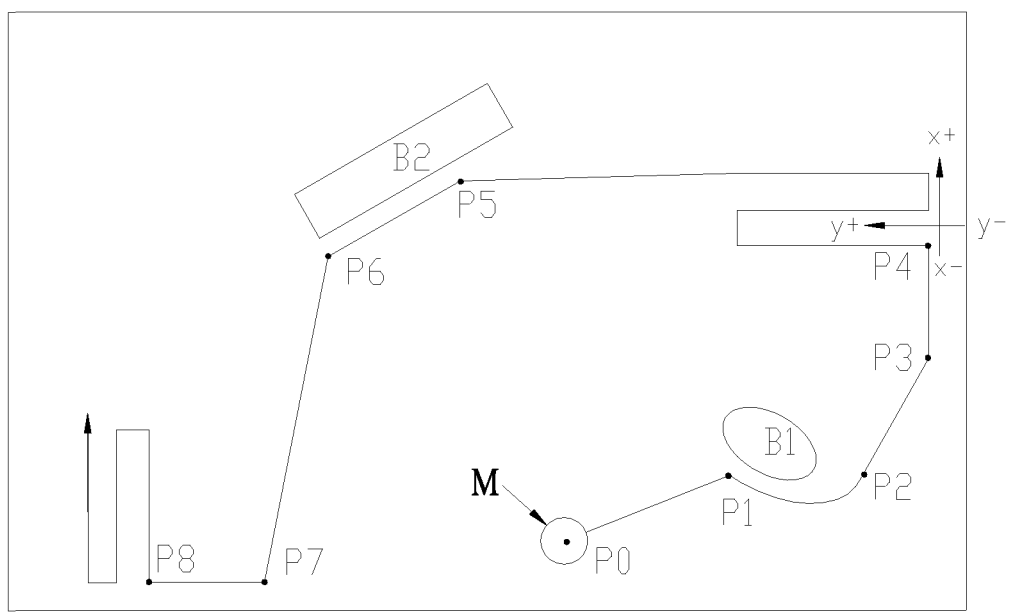
FIG. 6 is a trace diagram of a mobile robot in a working area in an embodiment of the present disclosure.

The following is a complete description of the implementation process of the present disclosure in conjunction with FIG. 6, which is a trace diagram of a mobile robot in a working area in an embodiment of the present disclosure.

As shown in FIG. 6, the working area of the cleaning robot is roughly rectangular. The working area includes an oval obstacle B1 (e.g. a table) and a rectangular obstacle B2 (e.g. a sofa).

The cleaning robot M starts from point P0 and then moves straight to point P1, at which point a table B1 is detected. The left side of the cleaning robot moves along the table B1 (an algorithm can enable the left or right side of the cleaning robot to move along an obstacle). The path between point P1 and point P2 in the process of the cleaning robot moving along the table B1 is curved (during this period it is considered that there is no long straight line at the edge of the table B1). When the cleaning robot reaches point P2, it has walked along table B1 for a predetermined time, a predetermined distance, or a predetermined rotation angle, so it stops moving along the table B1 and moves forward in a straight line in the current direction until point P3, where the edge of a wall is detected at point P3, and then the cleaning robot moves along the edge of the wall.

A long straight line is detected between point P3 and point P4, at which point the long straight line is used as a reference to establish a right-angle coordinate system: that is, establish the right-angle coordinate system using point P4 as the origin, using the current direction of the cleaning robot as the positive direction of the x-axis, and using the left direction of the cleaning robot perpendicular to the long straight line as the positive direction of the y-axis. The cleaning robot cleans according to the cleaning procedure until a sofa B2 is detected at point P5, and the cleaning robot begins to move along the sofa B2.

A long straight line is detected between point P5 and point P6, at which point the angle of the long straight line obtained from the gyroscope is approximately 150° (relative to the right-angle axis system established at point P4). The angle difference between the angle of the long straight line and each axis direction of the right-angle coordinate system is calculated, with the minimum angle difference Dx− being about 30°, far greater than the set threshold (1°). It is considered that the long straight line itself is not parallel to any axis directions of the coordinate system, so the current direction of the cleaning robot is not corrected. The cleaning robot at point P6 moves in the current direction straight forward until at point P7 the edge of the wall is detected, and then the cleaning robot moves along the edge of the wall.

A long straight line is detected between point P7 and point P8, at which point the angle of the long straight line obtained from the gyroscope is 89.5°, and the angle difference between the direction of the long straight line and the positive direction of the y-axis of the right-angle coordinate system is 0.5°, less than the set threshold (1°), at which point the direction of the cleaning robot at point P8 is corrected to 90°.

The above procedure repeats until the cleaning robot completes the work in the rectangular area.

The technical features of the embodiments described above may be arbitrarily combined. In order to make the description concise, not all possible combinations of the technical features in the above embodiment are described; however, as long as there is no contradiction between the combinations of these technical features, they should be considered to be within the scope of this specification.

The embodiments described above represent only a few embodiments of the present disclosure, the description thereof being more specific and detailed, but they cannot be understood as a limitation on the scope of the patent. It should be pointed out that a person skilled in the art, without departing from the concept of the present disclosure, can also make a number of variations and improvements, which all belong to the scope of protection of the present disclosure. Therefore, the scope of protection of the present disclosure shall be subject to the attached claims.

What is claimed is:

1. A method of angle correction of a mobile robot in a working area, comprising:
    obtaining a long straight line at an edge of an obstacle first found by the mobile robot wherein the long straight line is a straight line or an approximately straight line with a length greater than a preset value;
    establishing a right-angle coordinate system based on the long straight line;
    obtaining a walking angle of the mobile robot, a walking angle being an angle between an original traveling direction of the mobile robot and a corresponding walking direction, when the mobile robot finds a different long straight line along which the mobile robot walks at an edge of a different obstacle; and
    based on the walking angle and the right-angle coordinate system, correcting the walking angle to a corresponding axis direction of the right-angle coordinate system.

2. The method of claim 1, wherein the correcting comprises, when an angular difference between the walking angle and an axis direction of the right-angle coordinate system is less than a preset value, correcting the walking angle to the corresponding axis direction of the right-angle coordinate system.

3. The method of claim 1, further comprising, after the correcting, repeating the obtaining the walking angle and the correcting, until the mobile robot completes working in the working area.

4. The method of claim 1, wherein the obtaining the long straight line comprises:
    moving the mobile robot in a straight line until the mobile robot encounters an obstacle and walks along an edge of the obstacle;
    obtaining a plurality of walking angles of the mobile robot within a predetermined time T0;
    based on the plurality of walking angles of the mobile robot, determining whether values of the plurality of walking angles are near A0, wherein A0 is an average of the plurality of the walking angle values, and an amount of change is less than a threshold D0, wherein the amount of change is the amount of change between the walking angle values and the average walking angle value A0; and
    when the values of the plurality of walking angles are near A0 and the amount of change is less than D0, using the edge of the obstacle as the obtained long straight line.

5. The method of claim 4, further comprising, when the values of the plurality of walking angles are not near A0 or the amount of change is not less than D0, continuing the mobile robot's straight line motion after the mobile robot moves a predetermined time t0 or a predetermined distance d0 until the mobile robot encounters an obstacle and walks along an edge of the obstacle.

6. The method of claim 5, wherein the using comprises:
    obtaining a time during which the mobile robot walks along the obstacle;
    determining whether the time is greater than a predetermined value; and
    when the time is greater than the predetermined value, stopping the mobile robot walking along the edge of the obstacle and controlling the mobile robot's straight line motion until the mobile robot encounters an obstacle and walks along an edge of the obstacle.

7. The method of claim 4, wherein the using comprises:
    obtaining a time during which the mobile robot walks along the obstacle;
    determining whether the time is greater than a predetermined value; and
    when the time is greater than the predetermined value, stopping the mobile robot walking along the edge of the obstacle and controlling the mobile robot's straight line motion until the mobile robot encounters an obstacle and walks along an edge of the obstacle.

8. The method of claim 3, wherein the establishing comprises establishing the right-angle coordinate system using the mobile robot as an origin, using an A0 direction of the long straight line as an X-axis positive direction, and using a left direction or right direction perpendicular to the A0 direction of the long straight line a Y-axis positive direction.

9. The method of claim 1, wherein the obtaining the walking angle comprises:
    moving the mobile robot in a straight line until the mobile robot encounters the different obstacle and walks along an edge of the different obstacle;

obtaining a plurality of walking angles of the mobile robot within a predetermined time T1;

based on the plurality of walking angles of the mobile robot, determining whether values of the plurality of walking angle values are near an angle A1, wherein A1 is an average value of the plurality of walking angle values and an amount of change is less than a threshold D1, wherein the amount of change is an amount of change between the walking angle values and the average walking angle value A1; and when the values of the plurality of walking angle values are near A1 and the amount of change is less than D1, using A1 as the walking angle.

10. The method of claim 9, further comprising, when the values of the plurality of walking angle values are not near A1 or the amount of change is not less than D1, controlling the mobile robot's straight line motion after the mobile robot moves a predetermined time t1 or a predetermined distance d1 until the mobile robot encounters the different obstacle and walks along an edge of the different obstacle.

11. The method of claim 10, wherein the correcting comprises:

based on the walking angle A1, obtaining angular differences Dx+, Dx−, Dy+, Dy− between the walking angle A1 and the x-axis positive and negative directions, the y-axis positive and negative directions of the right-angle coordinate system, respectively;

determining whether Dx+, Dx−, Dy+, Dy− are less than a threshold D2; and when Dx+, Dx−, Dy+, Dy− are less than D2, correcting the walking angle of the mobile robot to the direction of the corresponding axis.

12. The method of claim 11, further comprising, when Dx+, Dx−, Dy+, Dy− are not less than D2, controlling the mobile robot's straight line motion after the mobile robot moves a predetermined time t2 or a predetermined distance d2 until the mobile robot encounters the different obstacle and walks along an edge of the different obstacle.

13. A mobile robot, comprising a controller, a drive system, an angle sensor, an edge sensor, a distance sensor, and a memory, wherein:

the edge sensor is configured to detect an edge of an obstacle in a working area and to make the mobile robot walk along the edge of the obstacle;

the controller is configured to:

detect at a first time whether a long straight line is present at the edge of the obstacle according to information received from the edge sensor, wherein the long straight line is a straight line or an approximately straight line with a length greater than a preset value;

establish a right-angle coordinate system using the long straight line detected at the first time as a reference;

obtain a walking angle of the mobile robot when a different long straight line along which the mobile robot walks is detected, a walking angle being an angle between an original traveling direction of the mobile robot and a corresponding walking direction; and when an angular difference between the walking angle and an axis direction of the right-angle coordinate system is less than a preset value, correct the walking angle of the mobile robot to the corresponding axis direction of the right-angle coordinate system;

the drive system is configured to drive the mobile robot to move;

the angle sensor is configured to obtain the walking angle of the mobile robot in real time;

the distance sensor is configured to obtain a walking distance of the mobile robot; and the memory is configured to store information about the right-angle coordinate system and a plurality of preset values.

14. The mobile robot of claim 13, wherein the angle sensor is a gyroscope or an electronic compass.

15. The mobile robot of claim 13, wherein the edge sensor is an infrared sensor.

16. The mobile robot of claim 13, wherein the distance sensor is an odometer.

17. The mobile robot of claim 13, wherein the mobile robot is a cleaning robot.

18. A method of angle correction of a mobile robot in a working area, comprising:

obtaining a long straight line at an edge of an obstacle first found by the mobile robot, wherein the long straight line is a straight line or an approximately straight line;

establishing a right-angle coordinate system based on the long straight line;

obtaining a walking angle of the mobile robot, a walking angle being an angle between an original traveling direction of the mobile robot and a corresponding walking direction, when the mobile robot finds a different long straight line along which the mobile robot walks at an edge of a different obstacle; and based on the walking angle and the right-angle coordinate system, correcting the walking angle to a corresponding axis direction of the right-angle coordinate system, wherein the correcting comprises, when an angular difference between the walking angle and an axis direction of the right-angle coordinate system is less than a preset value, correcting the walking angle to the corresponding axis direction.

19. The method of claim 18, wherein the long straight line has a length greater than a preset value.

* * * * *